(12) United States Patent
Huang et al.

(10) Patent No.: US 11,689,501 B2
(45) Date of Patent: Jun. 27, 2023

(54) DATA TRANSFER METHOD AND VIRTUAL SWITCH

(71) Applicant: Huawei Cloud Computing Technologies Co., Ltd., Guizhou (CN)

(72) Inventors: Jing Huang, Shenzhen (CN); Cong Xu, Hangzhou (CN); Shuai Chen, Shanghai (CN); Yuefei Xu, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 295 days.

(21) Appl. No.: 16/910,954

(22) Filed: Jun. 24, 2020

(65) Prior Publication Data
US 2020/0322313 A1 Oct. 8, 2020

Related U.S. Application Data

(63) Continuation of application No. PCT/CN2017/119103, filed on Dec. 27, 2017.

(51) Int. Cl.
*H04L 9/40* (2022.01)
*H04L 45/586* (2022.01)
(Continued)

(52) U.S. Cl.
CPC ........ *H04L 63/0245* (2013.01); *H04L 45/586* (2013.01); *H04L 47/31* (2013.01);
(Continued)

(58) Field of Classification Search
CPC ... H04L 63/0245; H04L 45/586; H04L 47/31; H04L 63/166; H04L 63/20; H04L 69/22
See application file for complete search history.

(56) References Cited

U.S. PATENT DOCUMENTS 8,789,135 B1 7/2014 Pani
9,727,307 B2 8/2017 Zheng
(Continued)

FOREIGN PATENT DOCUMENTS

CN 103534991 A 1/2014
CN 103609070 A 2/2014
(Continued)

OTHER PUBLICATIONS

Rodillas (PAN-OS 8.0: New Non-IP Protocol Control Feature Secures ICS Layer-2 Networks, 2 pages, Feb. 10, 2017) (Year: 2017).*
(Continued)

*Primary Examiner* — Oleg Korsak
(74) *Attorney, Agent, or Firm* — Conley Rose, P.C.

(57) ABSTRACT

A data transfer method and a virtual switch, where when receiving a data packet, the virtual switch extracts characteristic information of the data packet, and determines, based on the extracted characteristic information of the data packet, whether an expedited forwarding rule is configured for a data stream to which the data packet belongs. If the expedited forwarding rule is configured for the data stream to which the data packet belongs, the virtual switch bypasses a LINUX bridge to directly send the data packet to a receive end, thereby reducing times of data packet switching between a kernel mode and a user mode, and improving data packet forwarding efficiency.

20 Claims, 8 Drawing Sheets

(51) Int. Cl.
  *H04L 47/31*   (2022.01)
  *H04L 69/22*   (2022.01)
(52) U.S. Cl.
  CPC ............ *H04L 63/166* (2013.01); *H04L 63/20* (2013.01); *H04L 69/22* (2013.01)

(56) References Cited

U.S. PATENT DOCUMENTS

| | | | |
|---|---|---|---|
| 10,708,229 B2* | 7/2020 | Sevinc | ................ H04L 63/0263 |
| 2016/0142312 A1 | 5/2016 | Liu et al. | |
| 2016/0205071 A1* | 7/2016 | Cooper | ............... H04L 63/0209 726/1 |
| 2017/0359310 A1 | 12/2017 | Jameson et al. | |
| 2018/0139217 A1* | 5/2018 | Snapiri | ............... H04L 63/0254 |
| 2020/0154454 A1 | 5/2020 | Gao et al. | |

FOREIGN PATENT DOCUMENTS

| | | | | |
|---|---|---|---|---|
| CN | 104243447 A | 12/2014 | | |
| CN | 104301321 A | 1/2015 | | |
| CN | 104994094 A | 10/2015 | | |
| CN | 105262840 A | 1/2016 | | |
| CN | 105745886 A | 7/2016 | | |
| CN | 107396450 A | 11/2017 | | |
| CN | 109496409 A * | 3/2019 | ........... | H04L 12/462 |
| WO | 2005064842 A1 | 7/2005 | | |
| WO | 2015041706 A1 | 3/2015 | | |

OTHER PUBLICATIONS

Lou Jiapeng, et al., "Design of Network Covert Transmission Scheme Based on TCP," Netinfo Security, 2016 (1), 6 pages.
ONF Open Network Foundation "MPLS-TP OpenFlow Protocol Extensions for SPTN," Version 1.0, Jun. 16, 2017, 71 pages.
Bickford, J., et al., "Safe Internet Browsing Using a Transparent Virtual Browser," 2015 IEEE 2nd International Conference on Cyber Security and Cloud Computing, 10 pages.

* cited by examiner

DATA TRANSFER METHOD AND VIRTUAL SWITCH

CROSS-REFERENCE TO RELATED APPLICATIONS

This application is a continuation of International Patent Application No. PCT/CN2017/119103 filed on Dec. 27, 2017, which is hereby incorporated by reference in its entirety.

TECHNICAL FIELD

The present disclosure relates to the field of information technologies, and in particular, to a data transfer method and a virtual switch.

BACKGROUND

In a public cloud scenario, various applications and services all run on a same platform. This imposes a relatively high requirement on network security. Network security verification on a data stream may be implemented by configuring an IPTABLES rule in a LINUX bridge. As shown in FIG. 1, when a first virtual machine 100 sends a data stream to a second virtual machine 130, before the data stream arrives at a virtual switch 120 and is forwarded by the virtual switch 120, the data stream first enters a LINUX bridge 110, and security verification is implemented using an IPTABLES rule in the LINUX bridge 110. A data stream for which security verification succeeds in the LINUX bridge 110 is imported into the virtual switch for traffic forwarding, and a data stream for which security verification fails is discarded in the LINUX bridge 110.

The IPTABLES rule configured in the LINUX bridge may be used to implement abundant network security functions. However, in consideration of compatibility and abundant functions of IPTABLES, implementation of some security verification reduces data stream forwarding performance. In addition, security verification in the LINUX bridge is performed in a kernel mode, and the virtual switch forwards a data stream in a user mode. Therefore, each time a data stream is forwarded through the virtual switch, switching from the kernel mode to the user mode is performed. Switching from the kernel mode to the user mode causes cache pollution, thereby further reducing data stream forwarding efficiency.

SUMMARY

The present disclosure provides a data transfer method and a virtual switch. In the present disclosure, some data packets may bypass a security verification module and be directly forwarded by the virtual switch, reducing times of data packet switching between a kernel mode and a user mode during a data stream forwarding process, and improving efficiency in forwarding a data stream by the virtual switch.

A first aspect of the present disclosure provides a data transfer method. The method includes the following steps. A virtual switch receives a first data packet, and after extracting characteristic information of the first data packet, determines, based on the extracted characteristic information of the first data packet, whether an expedited forwarding rule is configured for a data stream to which the first data packet belongs. The expedited forwarding rule indicates that a second data packet in the data stream to which the first data packet belongs has been verified by a security verification module and a verification result is secure. If the expedited forwarding rule is configured for the data stream to which the first data packet belongs, the virtual switch bypasses the security verification module to send the first data packet to a receive end. The security verification module includes but is not limited to a LINUX bridge, and is configured to verify whether the first data packet is secure.

In this implementation, when a transmit end sends a data packet to the receive end through the virtual switch, a data packet belonging to the data stream for which the expedited forwarding rule is configured may bypass the security verification module and be directly forwarded by the virtual switch without security verification, reducing times of data packet switching between a kernel mode and a user mode, and improving data packet forwarding efficiency.

With reference to the first aspect, in a first implementation of the first aspect, the security verification module verifies whether the first data packet is secure. If a verification result of the first data packet is secure, the security verification module forwards the first data packet to the receive end, or if a verification result of the first data packet is "insecure", the security verification module discards the first data packet. This implementation provides processing on the first data packet when security verification cannot succeed.

With reference to the first aspect or the first implementation of the first aspect, in a second implementation of the first aspect, if the expedited forwarding rule is not configured for the data stream to which the first data packet belongs, the virtual switch forwards the first data packet to the security verification module. This implementation provides processing on a data packet belonging to the data stream for which the expedited forwarding rule is not configured, and security verification in the security verification module is provided for the data packet, ensuring security of all forwarded data streams.

With reference to the first aspect or the first implementation of the first aspect, in a third implementation of the first aspect, before extracting the characteristic information of the first data packet, the virtual switch determines whether security verification on the first data packet has been performed, and if security verification on the first data packet has not been performed, extracts the characteristic information of the first data packet. This implementation supplements the data transfer method in the present disclosure, making the method more complete.

With reference to the third implementation of the first aspect, in a fourth implementation of the first aspect, if the virtual switch determines that security verification on the first data packet has been performed, the virtual switch extracts the characteristic information of the first data packet, establishes, based on the characteristic information of the first data packet, the expedited forwarding rule for the data stream to which the first data packet belongs, and sends the first data packet to the receive end. This implementation further supplements the data transfer method in the present disclosure. The expedited forwarding rule is configured for the data stream to which the first data packet belongs such that the second data packet in the data stream may bypass the security verification module when being forwarded through the virtual switch, further improving data stream forwarding efficiency.

With reference to the fourth implementation of the first aspect, in a fifth implementation of the first aspect, if the virtual switch determines that security verification on the first data packet has been performed and the virtual switch determines that the first data packet is not a packet that is based on the Internet Protocol (IP), the virtual switch sends the first data packet to the receive end. This implementation supplements a method for forwarding a data packet by the virtual switch when a non-IP special packet exists in data packets received by the virtual switch, making the method more complete.

With reference to the third implementation of the first aspect, in a sixth implementation of the first aspect, after the virtual switch determines that security verification on the first data packet has not been performed and before the characteristic information of the first data packet is extracted, the virtual switch determines whether the first data packet is an IP packet, and if the first data packet is a packet that is based on the IP, the virtual switch performs the step of extracting characteristic information of the first data packet. This implementation further supplements a method for forwarding a data packet by the virtual switch when a non-IP special packet exists in data packets received by the virtual switch, making the method more complete.

With reference to the sixth implementation of the first aspect, in a seventh implementation of the first aspect, if the virtual switch determines that the first data packet is a packet that is not based on the IP, the virtual switch forwards the first data packet to the security verification module. This implementation further supplements a method for forwarding a non-IP special packet by the virtual switch, making the method more complete.

With reference to any one of the first aspect or the first to the seventh implementations of the first aspect, in an eighth implementation of the first aspect, the characteristic information includes IP quintuplet information, and the quintuplet information includes an IP address of a transmit end that sends the first data packet to the virtual switch, an IP address of the receive end, a port number of the transmit end, a port number of the receive end, and a transport layer protocol of the first data packet, and the expedited forwarding rule includes the IP quintuplet information. This implementation further supplements the data transfer method in the present disclosure, making the method more complete.

A second aspect of the present disclosure provides a data transfer method. The method includes the following steps. A virtual switch receives a first data packet, and after extracting characteristic information of the first data packet, determines, based on the extracted characteristic information of the first data packet, whether an expedited forwarding rule is configured for a data stream to which the first data packet belongs. The expedited forwarding rule indicates that a second data packet in the data stream to which the first data packet belongs has been verified by a security verification module and a verification result is secure. If the expedited forwarding rule is configured for the data stream to which the first data packet belongs, the virtual switch bypasses the security verification module to send the first data packet to a receive end. The security verification module includes but is not limited to a LINUX bridge, and is configured to verify whether the first data packet is secure.

In this implementation, when a transmit end sends a data packet to the receive end through the virtual switch, a data packet belonging to the data stream for which the expedited forwarding rule is configured may bypass the security verification module and be directly forwarded by the virtual switch without security verification, reducing times of data packet switching between a kernel mode and a user mode, and improving data packet forwarding efficiency.

With reference to the second aspect, in a first implementation of the second aspect, the security verification module verifies whether the first data packet is secure. If a verification result of the first data packet is secure, the security verification module forwards the first data packet to the receive end, or if a verification result of the first data packet is "insecure", the security verification module discards the first data packet. This implementation provides processing on the first data packet when security verification on the first data packet cannot succeed in the security verification module.

With reference to the second aspect or the first implementation of the second aspect, in a second implementation of the second aspect, if the expedited forwarding rule is not configured for the data stream to which the first data packet belongs, the virtual switch forwards the first data packet to the security verification module. This implementation provides processing on a data packet belonging to the data stream for which the expedited forwarding rule is not configured, and security verification in the security verification module is provided for the data packet, ensuring security of all forwarded data streams.

With reference to the second aspect, in a third implementation of the second aspect, before the virtual switch extracts the characteristic information of the first data packet, the virtual switch determines whether the first data packet is a packet that is based on the IP, and if the first data packet is a packet that is based on the IP, the virtual switch performs the step of extracting characteristic information of the first data packet. This implementation supplements a method for forwarding a data packet by the virtual switch when a non-IP special packet exists in data packets received by the virtual switch, making the method more complete.

With reference to the third implementation of the second aspect, in a fourth implementation of the second aspect, if the virtual switch determines that the first data packet is a packet that is not based on the IP, the virtual switch determines whether security verification on the first data packet has been performed. If security verification on the first data packet has not been performed, the virtual switch forwards the first data packet to the security verification module. This implementation further supplements a method for forwarding a data packet by the virtual switch when a non-IP special packet exists in data packets received by the virtual switch, making the method more complete.

With reference to the fourth implementation of the second aspect, in a fifth implementation of the second aspect, if the virtual switch determines that the first data packet is a packet that is not based on the IP and security verification on the first data packet has been performed, the virtual switch forwards the first data packet to the receive end. This implementation further supplements a method for forwarding a data packet by the virtual switch when a non-IP special packet exists in data packets received by the virtual switch, making the method more complete.

With reference to the third implementation of the second aspect, in a sixth implementation of the second aspect, after the virtual switch determines that the first data packet is a packet that is based on the IP and before the characteristic information of the first data packet is extracted, the virtual switch determines whether security verification on the first data packet has been performed, and if security verification on the first data packet has not been performed, the virtual switch performs the step of extracting characteristic information of the first data packet. This implementation further supplements the data transfer method in the present disclosure, making the method more complete.

With reference to the sixth implementation of the second aspect, in a seventh implementation of the second aspect, if the virtual switch determines that security verification on the first data packet has been performed, the virtual switch extracts the characteristic information of the first data packet, establishes, based on the characteristic information of the first data packet, the expedited forwarding rule for the data stream to which the first data packet belongs, and forwards the first data packet to the receive end. This implementation further supplements the data transfer method in the present disclosure. The expedited forwarding rule is configured for the data stream to which a data packet belongs such that the second data packet in the data stream may bypass the security verification module when being forwarded through the virtual switch, further improving data stream forwarding efficiency.

With reference to any one of the second aspect or the first to the seventh implementations of the second aspect, in an eighth implementation of the second aspect, the characteristic information includes IP quintuplet information, and the quintuplet information includes an IP address of a transmit end that sends the first data packet to the virtual switch, an IP address of the receive end, a port number of the transmit end, a port number of the receive end, and a transport layer protocol of the first data packet, and the expedited forwarding rule includes the IP quintuplet information. This implementation further supplements the data transfer method in the present disclosure, making the method more complete.

According to a third aspect, the present disclosure provides a virtual switch. The virtual switch includes a receiving unit, a forwarding unit, and a determining unit, where the forwarding unit and the determining unit are configured to perform the method according to any implementation of the first aspect in the present disclosure.

According to a fourth aspect, the present disclosure provides a virtual switch. The virtual switch includes a receiving unit, a forwarding unit, and a determining unit, where the forwarding unit and the determining unit are configured to perform the method according to any implementation of the second aspect in the present disclosure.

According to a fifth aspect, the present disclosure further provides a computer program product and a non-volatile computer-readable storage medium, where the computer program product and the non-volatile computer-readable storage medium include a computer instruction. A processor executes the computer instruction to implement the method according to any implementation of the first aspect in the present disclosure.

According to a sixth aspect, the present disclosure further provides a computer program product and a non-volatile computer-readable storage medium, where the computer program product and the non-volatile computer-readable storage medium include a computer instruction. A processor executes the computer instruction to implement the method according to any implementation of the second aspect in the present disclosure.

According to a sixth aspect, the present disclosure further provides a computing device. The computing device includes a processor and a memory, where the memory is configured to store an execution instruction. When the computing device runs, the processor executes the execution instruction stored in the memory such that the computing device implements the method according to any implementation of the first aspect.

According to a seventh aspect, the present disclosure further provides a computing device. The computing device includes a processor and a memory, where the memory is configured to store an execution instruction. When the computing device runs, the processor executes the execution instruction stored in the memory such that the computing device implements the method according to any implementation of the second aspect.

DESCRIPTION OF EMBODIMENTS

Data transfer between two virtual machines and data transfer between a virtual machine and bare metal both require participation of a virtual switch. Two virtual machines that perform data transfer may be on a same computing node, or may be on different computing nodes. Both a transmit end and a receive end may be virtual machines or bare metal. A process in which the transmit end forwards a data stream or a data packet to the receive end includes a process in which a first virtual machine sends a data stream or a data packet to a second virtual machine or bare metal and a process in which the first virtual machine receives a data stream or a data packet from the second virtual machine or the bare metal. Details are as follows.

Figure 1:
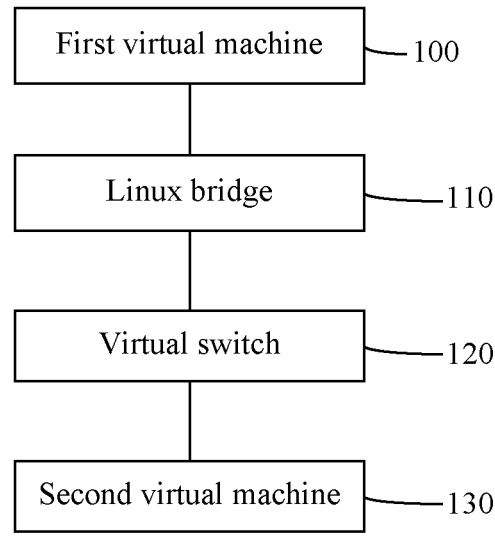
FIG. 1 is a schematic diagram of performing security verification at a LINUX bridge before a data stream enters a virtual switch.
Figure 2A:
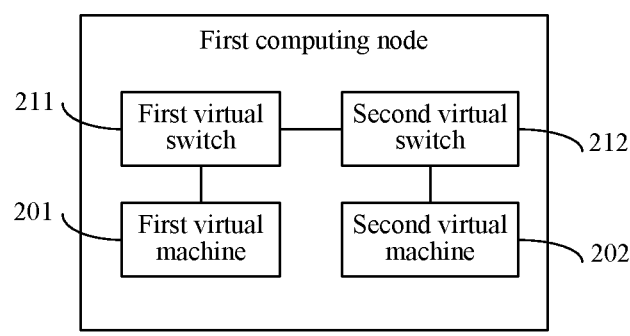
FIG. 2A is a schematic diagram of data transfer between two virtual switches on a same computing node.
Figure 2B:
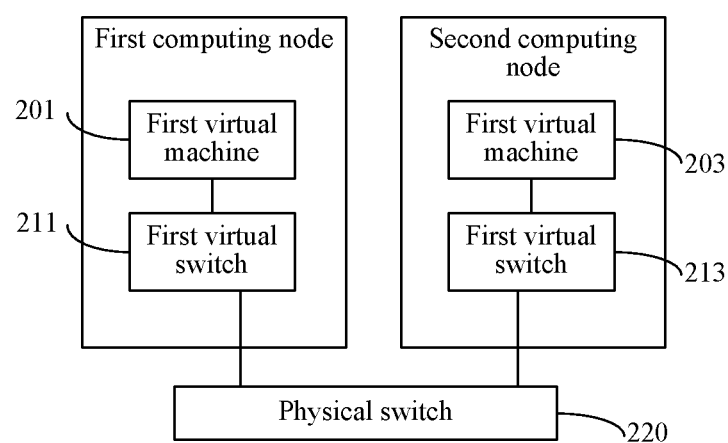
FIG. 2B is a schematic diagram of data transfer between two virtual switches on different computing nodes.
Figure 2C:
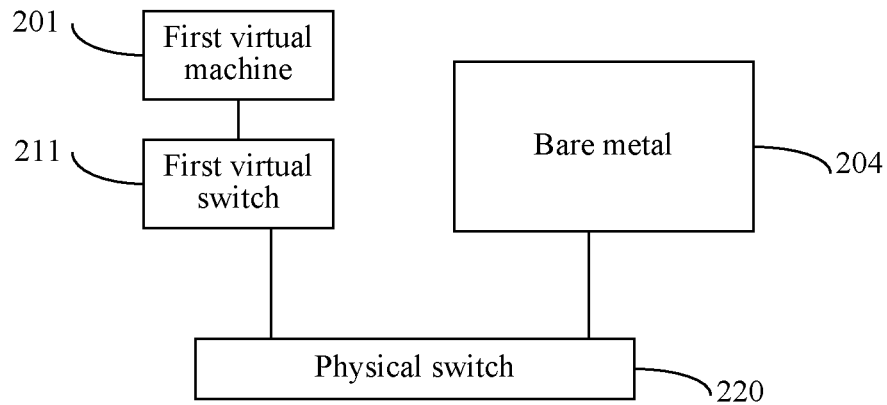
FIG. 2C is a schematic diagram of data transfer between a virtual machine and bare metal.

As shown in FIG. 2A, during data transfer between a first virtual machine 201 and a second virtual machine 202 on a first computing node, a process in which a first virtual switch 211 forwards a data packet includes that the first virtual switch 211 receives a data packet from the first virtual machine 201 and forwards the data packet to a second virtual switch 212, and a process in which the second virtual machine 212 receives a data packet includes that the second virtual switch 212 receives the data packet from the first virtual switch 211 and forwards the data packet to the second virtual machine 202. As shown in FIG. 2B, during data transfer between a first virtual machine 201 on a first computing node and a third virtual machine 203 on a second computing node, a data packet needs to pass through a physical switch 220. A process in which the first virtual machine 201 forwards a data packet includes that a first virtual switch 211 receives a data packet from the first virtual machine 201 and forwards the data packet to the physical switch 220, and the physical switch 220 then forwards the data packet to a third virtual switch 213, and a process in which the third virtual machine 203 receives a data packet includes that the third virtual switch 213 receives the data packet from the physical switch 220 and forwards the data packet to the third virtual machine 203. During data transfer between the first virtual machine 201 and bare metal 204, a data packet needs to pass through the physical switch 220. In FIG. 2B, the physical switch 220 may be replaced by a group of several physical switches. In this case, the group of physical switches is responsible for data transfer between the virtual switch 211 and the virtual switch 213. As shown in FIG. 2C, a process in which a first virtual machine 201 forwards a data packet to bare metal 204 includes that a first virtual switch 211 receives a data packet from the first virtual machine 201 and forwards the data packet to a physical switch 220, and the physical switch 220 then forwards the data packet to the bare metal 204, and a process in which the first virtual machine 201 receives a data packet from the bare metal 204 includes that the first virtual switch 211 receives, from the physical switch 220, a data packet that is from the bare metal 204 and forwards the data packet to the first virtual machine 201. In FIG. 2C, the physical switch 220 may be replaced by a group of several physical switches. In this case, the group of physical switches is responsible for data transfer between the virtual switch 211 and the bare metal 204. The group of physical switches may include a gateway.

During forwarding of a data stream or a data packet between two virtual machines or between a virtual machine and bare metal, whether the data stream or the data packet is secure needs to be verified. During data transfer between two virtual machines or between a virtual machine and bare metal, a transferred data stream may include several data packets. Data packets with same characteristic information belong to one data stream. Security verification on a data stream is security verification on a data packet in the data stream. Security verification on a data stream is implemented by security verification on a data packet included in the data stream. If a verification result of the data packet is secure, it is considered that the data stream to which the data packet belongs is secure. In this case, another data packet in the data stream to which the data packet belongs is also considered to be secure. If a virtual switch cannot verify security of a received data packet, the virtual switch needs to forward the data packet to a security verification module such that the data packet is verified in the security verification module. A specific implementation of the security verification module includes but is not limited to a LINUX bridge. IPTABLES configured in the LINUX bridge may be used to complete security verification on a data stream or a data packet. The security verification module in this embodiment may be any module that can perform security verification on a data stream or a data packet, such as a verification module, a security check module, or a packet detection module.

The present disclosure provides an embodiment such that when some data streams forwarded by a transmit end to a receive end are forwarded through a virtual switch, the data streams do not enter a security verification module and are directly forwarded by the virtual switch, thereby improving data transmission efficiency. In addition, times of switching between a kernel mode and a user mode are reduced, and data stream forwarding performance is improved.

Figure 3:
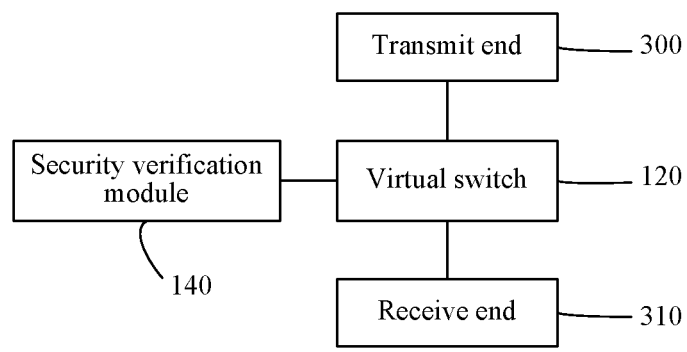
FIG. 3 is a schematic diagram of connection relationships between a virtual switch, and a LINUX bridge, a transmit end, and a receive end according to an embodiment of the present disclosure.

In this embodiment of the present disclosure, as shown in FIG. 3, a virtual switch 120 is connected to a security verification module 140, a transmit end 300, and a receive end 310. When the transmit end 300 forwards a first data packet to the receive end 310 through the virtual switch 120, the first data packet sent by the transmit end 300 bypasses the security verification module 140 to enter the virtual switch 120. The virtual switch 120 identifies whether an expedited forwarding rule is configured for a data stream to which the first data packet sent by the transmit end 300 belongs. If the expedited forwarding rule is configured for the data stream to which the first data packet belongs, the virtual switch 120 forwards the first data packet to the receive end 310.

The expedited forwarding rule indicates that a second data packet in the data stream to which the first data packet belongs has been verified by the security verification module and a verification result is secure. If the verification result of the second data packet is secure, the first data packet belonging to the same data stream as the second data packet is also considered to be secure. To be specific, if the expedited forwarding rule is configured for the data stream to which the first data packet belongs, it is considered that the first data packet is secure, and the virtual switch may bypass the security verification module to forward the first data packet to a next node. In this embodiment of the present disclosure, a specific implementation of determining whether an expedited forwarding rule is configured for a data stream to which a data packet belongs includes but is not limited to querying a connection tracking table based on extracted characteristic information of the data packet. Because data packets belonging to a same data stream have same characteristic information, the characteristic information may be used to distinguish between data streams. In this case, the connection tracking table that can record the characteristic information may record a data stream for which the expedited forwarding rule is configured. The connection tracking table is a table in the virtual switch 120. An entry of the connection tracking table includes the characteristic information of the data stream. The connection tracking table is queried using the extracted characteristic information of the data packet such that it may be learned whether the expedited forwarding rule is configured for the data stream to which the data packet belongs. The characteristic information of the data stream may include IP quintuplet information of the data packet. The IP quintuplet information includes an IP address of the transmit end 300, an IP address of the receive end 310, a port number of the transmit end 300, a port number of the receive end 310, and a transport layer protocol of the first data packet. The transport layer protocol may be a Transmission Control Protocol (TCP) or a User Datagram Protocol (UDP), and the TCP and the UDP respectively correspond to a TCP packet and a UDP packet. The expedited forwarding rule in this embodiment may be any forwarding rule or characteristic that can make the virtual switch accordingly identify a data packet that can be directly forwarded to the receive end, such as a direct forwarding rule or a direct forwarding identification characteristic.

In this embodiment of the present disclosure, when the transmit end 300 sends the data packet to the receive end 310 through the virtual switch 120, the data packet belonging to the data stream for which the expedited forwarding rule is configured may bypass the security verification module without security verification, and be forwarded by the virtual switch 120, reducing times of data packet switching between a kernel mode of the security verification module 140 and a user mode of the virtual switch 120, and improving data packet forwarding efficiency.

If the expedited forwarding rule is not configured for the data stream to which the first data packet received by the virtual switch belongs, it indicates that the first data packet is the earliest data packet, received by the virtual switch 120, in the data stream, and security verification on the first data packet has not been performed. In this case, the virtual switch 120 forwards the first data packet to the security verification module 140 for security verification. If security verification on the first data packet fails, the security verification module 140 discards the first data packet. If security verification on the first data packet succeeds, the security verification module returns the first data packet to the virtual switch 120, and the virtual switch 120 then forwards the first data packet to the receive end 310.

That is, the data packet received by the virtual switch 120 may be from the transmit end 300, or may be from the security verification module 140. To be specific, the first data packet received by the virtual switch 120 may be a data packet to be forwarded, or may be a data packet on which security verification succeeds in the security verification module. Therefore, after the virtual switch 120 receives the first data packet, the virtual switch 120 needs to determine whether security verification on the first data packet has been performed. If security verification on the first data packet has not been performed, it indicates that the first data packet is from the transmit end 300, and the virtual switch performs a step of extracting the characteristic information of the first data packet. If security verification on the first data packet has been performed, the virtual switch 120 forwards the first data packet to the receive end 310. To make another data packet in the data stream to which the first data packet belongs bypass the security verification module when the virtual switch 120 forwards the other data packet, the virtual switch 120 establishes, based on the characteristic information of the first data packet, the expedited forwarding rule for the data stream to which the data packet belongs. In this embodiment, the virtual switch 120 may determine, by determining whether the data packet is from the security verification module, whether security verification on the data packet has been performed. A data packet from the security verification module may be considered as a data packet on which security verification has been performed.

When the first data packet forwarded by the transmit end 300 to the receive end through the virtual switch 120 is a non-IP special packet and the special packet does not have IP quintuplet information, a data stream to which the special packet belongs cannot be recorded in the expedited forwarding rule, and the virtual switch 120 cannot determine whether the data stream to which the special packet belongs matches an expedited forwarding rule. Therefore, each special packet received by the virtual switch 120 may be forwarded by the virtual switch 120 to the security verification module, and security verification is performed in the security verification module. Details are as follows.

Before the virtual switch 120 extracts the characteristic information of the first data packet, if the virtual switch 120 determines that security verification on the first data packet has not been performed, the virtual switch 120 determines whether the first data packet is a packet that is based on the IP. If the first data packet is a packet that is based on the IP, the virtual switch 120 performs the step of extracting the characteristic information of the first data packet, or if the first data packet is a non-IP special packet, the virtual switch 120 forwards the first data packet to the security verification module.

Before the virtual switch 120 extracts the characteristic information of the first data packet, if the virtual switch 120 determines that security verification on the first data packet has been performed, the virtual switch 120 may still further determine whether the first data packet is a packet that is based on the IP. If the first data packet is a packet that is based on the IP, the virtual switch 120 extracts the characteristic information of the first data packet, establishes, based on the characteristic information of the first data packet, the expedited forwarding rule for the data stream to which the first data packet belongs, and forwards the first data packet to the receive end. If the first data packet is a non-IP special packet, the virtual switch 120 directly forwards the first data packet to the receive end.

In this embodiment of the present disclosure, the special packet that is not based on the IP includes but is not limited to an IP fragmented packet and a traceroute packet.

It can be learned from the foregoing that, in this embodiment of the present disclosure, steps performed by the virtual switch may include two determining steps determining whether security verification on the data packet has been performed and determining whether the data packet is a packet that is based on the IP. In the foregoing method for forwarding a data packet by the virtual switch 120, the virtual switch 120 first performs a step of determining whether security verification on the data packet has been performed. The following describes a specific implementation of first determining whether the first data packet is a packet that is based on the IP and then determining whether security verification on the first data packet has been performed.

The first data packet sent by the transmit end 300 bypasses the security verification module 140 to enter the virtual switch 120. The virtual switch 120 identifies whether an expedited forwarding rule is configured for a data stream to which the first data packet sent by the transmit end 300 belongs. If the expedited forwarding rule is configured for the data stream to which the first data packet belongs, the virtual switch 120 forwards the first data packet to the receive end 310.

If the expedited forwarding rule is not configured for the data stream to which the first data packet received by the virtual switch 120 belongs, the virtual switch 120 forwards the first data packet to the security verification module 140 for security verification. If security verification on the first data packet fails, the security verification module 140 discards the first data packet. If security verification on the first data packet succeeds, the security verification module returns the first data packet to the virtual switch 120, and the virtual switch 120 then forwards the first data packet to the receive end 310.

Before the virtual switch 120 extracts the characteristic information of the first data packet, the virtual switch 120 determines whether the first data packet is a packet that is based on the IP, and if the first data packet is a packet that is based on the IP, the virtual switch 120 performs the step of extracting the characteristic information of the first data packet. If the first data packet is not a packet that is based on the IP, the virtual switch 120 determines whether security verification on the first data packet has been performed. If security verification on the first data packet has not been performed, the first data packet is forwarded to the security verification module. If the virtual switch 120 determines that the first data packet is a special packet that is not based on the IP and security verification on the first data packet has been performed, the virtual switch 120 forwards the first data packet to the receive end.

After the virtual switch 120 determines that the first data packet is a packet that is based on the IP and before the characteristic information of the first data packet is extracted, the virtual switch 120 determines whether security verification on the first data packet has been performed. If security verification on the first data packet has not been performed, it indicates that the first data packet is from the transmit end 300. In this case, for the first data packet that is based on the IP and that is from the transmit end 300, the virtual switch 120 performs the step of extracting the characteristic information of the first data packet. If security verification on the first data packet has been performed, it indicates that the expedited forwarding rule is not configured for the data stream to which the IP-based first data packet belongs. In this case, in addition to forwarding the first data packet on which security verification has been performed, the virtual switch 120 may further establish, based on the characteristic information of the first data packet, the expedited forwarding rule for the data stream to which the first data packet belongs.

In this embodiment of the present disclosure, that the virtual switch receives the data packet forwarded by the transmit end and that the virtual switch forwards the data packet to the receive end both include various cases in which the virtual switch needs to check the data stream or the data packet in a process in which the transmit end forwards the data stream or the data packet to the receive end. That the virtual switch receives the data packet forwarded by the transmit end includes the virtual switch receives the data packet from the transmit end, and the virtual switch receives the data packet from the transmit end through another node. That the virtual switch forwards the data packet to the receive end includes forwarding the data packet to the receive end and forwarding the data packet to the receive end through another node. The other node includes but is not limited to a network device such as a physical switch, another virtual switch, a gateway, or a router. In this embodiment of the present disclosure, the security verification module may be a LINUX bridge.

Figure 4:
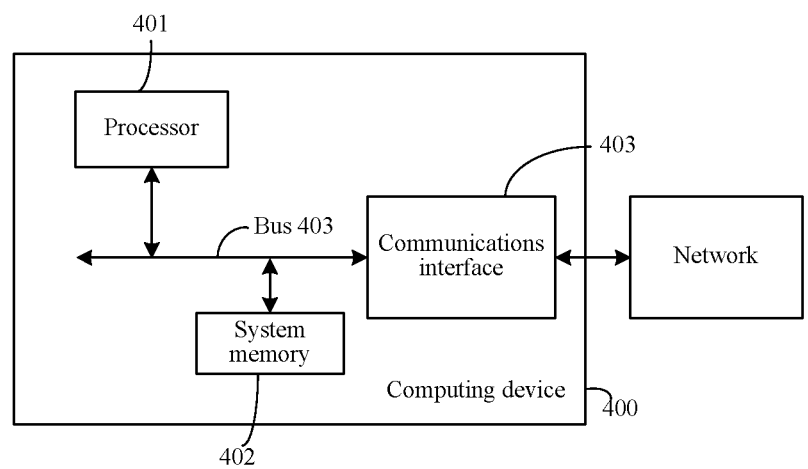
FIG. 4 is a schematic diagram of a host according to an embodiment of the present disclosure.

FIG. 4 is a schematic structural diagram of a computing device 400 according to one embodiment of the present disclosure.

As shown in FIG. 4, a server 400 includes a processor 401, and the processor 401 is connected to a system memory 402. The processor 401 may be a computing logic such as a central processing unit (CPU), a graphics processing unit (GPU), a field programmable gate array (FPGA), or a digital signal processor (DSP), or a combination of any of the foregoing computing logics. The processor 201 may be a single-core processor or a multi-core processor. A bus 403 is configured to transfer information between components of the server 400, and the bus 403 may use a wired connection manner or may use a wireless connection manner. This is not limited in this application. The bus 403 is further connected to a communications interface 404. The communications interface 404 uses a transceiver apparatus, such as but not limited to a transceiver, to implement communication with another device or network. The communications interface 404 may be interconnected to a network in a wired or wireless manner. Methods in embodiments of the present disclosure may be completed/supported by executing, by the processor 401, software code in the system memory 402.

In addition, FIG. 4 is merely an example of the server 400. The server 400 may include more or fewer components than those shown in FIG. 4, or may have a different component configuration manner. In addition, various components shown in FIG. 4 may be implemented by hardware, software, or a combination of hardware and software.

The following describes a procedure in which a virtual switch forwards a data packet in an embodiment of the present disclosure.

Figure 5A:
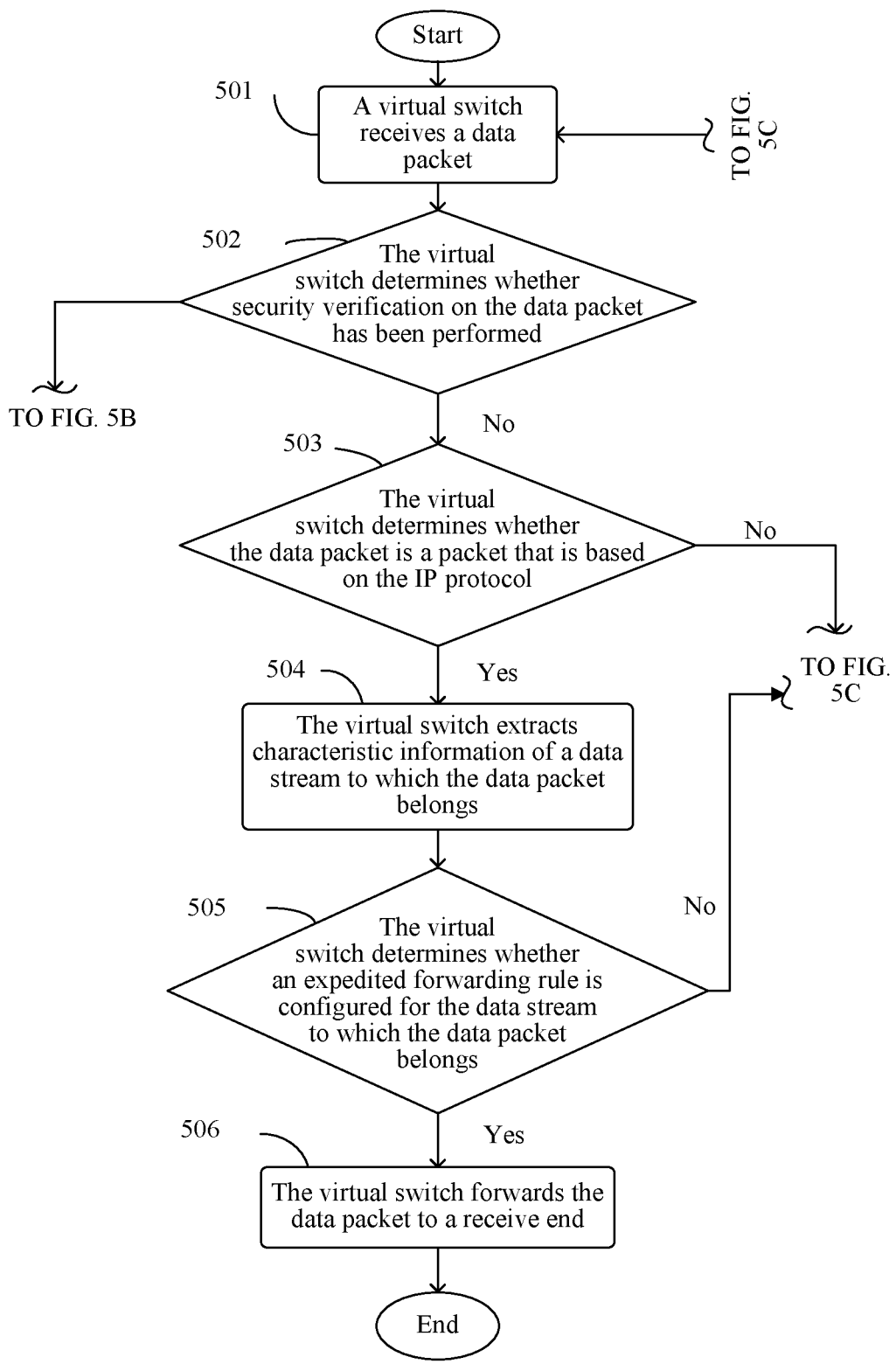
FIG. 5A, FIG. 5B, and FIG. 5C are a schematic flowchart of data transfer according to an embodiment of the present disclosure.
Figure 5B:
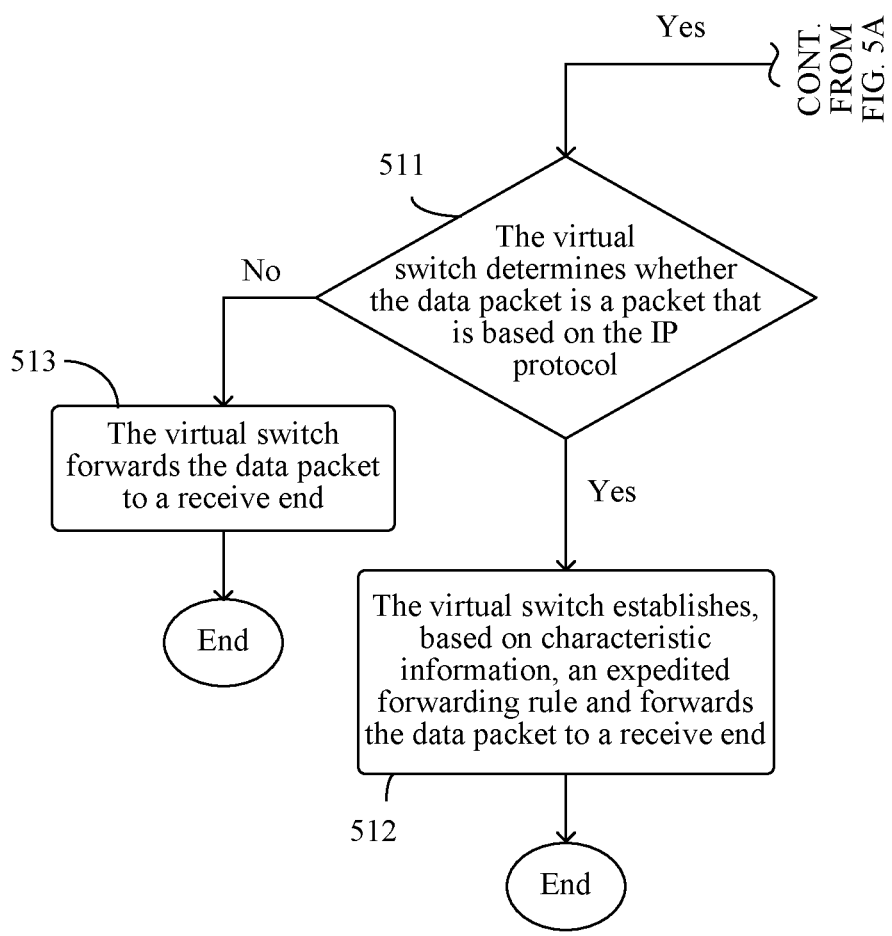
Figure 5C:
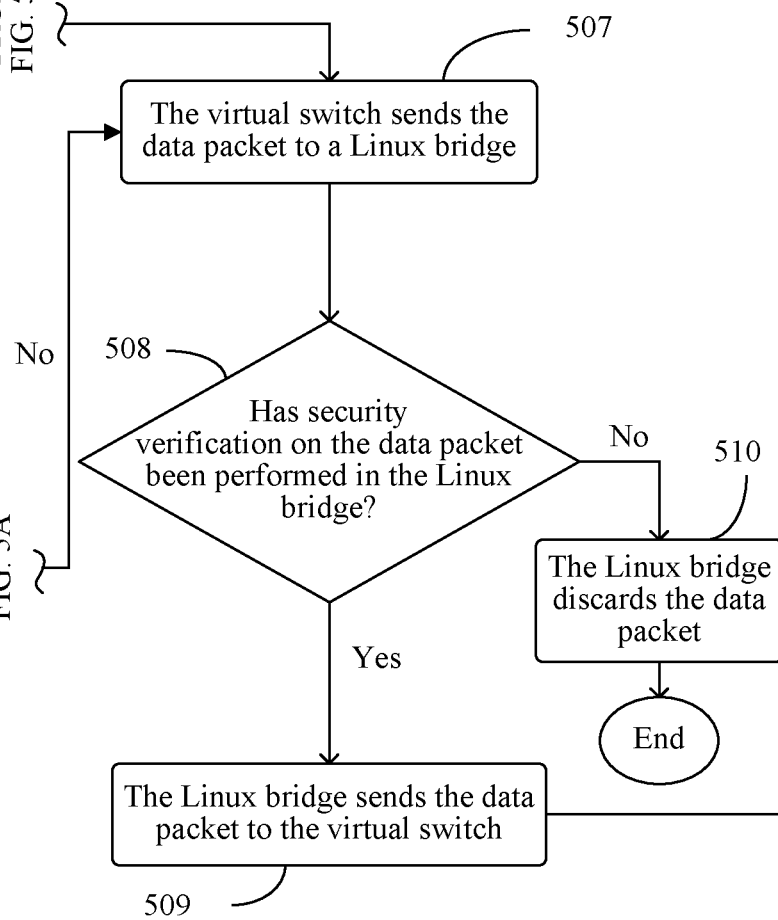

In one embodiment of the present disclosure, after receiving a data stream, a virtual switch first determines whether the data stream is from a security verification module and then determines whether the received data stream is a packet that is based on the IP. A specific procedure is shown in FIG. 5A, FIG. 5B, and FIG. 5C.

s501. The virtual switch receives a data packet.

s502. The virtual switch determines whether security verification on the data packet has been performed. Further, the virtual switch may determine whether security verification on the data packet has been performed by determining whether the data packet is from a LINUX bridge.

s503. The virtual switch determines whether the data packet is a packet that is based on the IP. The virtual switch performs this step after determining, in s502, that security verification on the data packet has not been performed. Further, it can be determined, by determining whether a data stream to which the data packet belongs has characteristic information, whether the data packet is a packet that is based on the IP. A packet belonging to a data stream that has the characteristic information is a packet that is based on the IP. A packet belonging to a data stream that has no characteristic information is a non-IP special packet. This step distinguishes an IP-based packet from a non-IP special packet, to implement different processing manners for two types of packets, ensuring integrity of the method procedure. The characteristic information of the data stream may include IP quintuplet information of the data packet. The IP quintuplet information includes an IP address of a transmit end 300, an IP address of a receive end 310, a port number of the transmit end 300, a port number of the receive end 310, and a transport layer protocol of the data packet. The transport layer protocol may be the TCP or the UDP, and the TCP and the UDP respectively correspond to a TCP packet and a UDP packet.

s504. The virtual switch extracts characteristic information of a data stream to which the data packet belongs for step s505. The virtual switch performs this step after determining, in s503, that the data packet is a packet that is based on the IP.

s505. The virtual switch determines whether an expedited forwarding rule is configured for a data stream to which the data packet belongs. In this step, the virtual switch determines whether the virtual switch can bypass the LINUX bridge to directly forward the data packet to the receive end. Further, the virtual switch queries a connection tracking table based on the characteristic information extracted in step s504. The connection tracking table is a table that is in the virtual switch and that is used to record the expedited forwarding rule. An entry of the connection tracking table includes the characteristic information of the data stream. The connection tracking table is queried using the extracted characteristic of the data stream such that it may be learned whether the expedited forwarding rule is configured for the data stream to which the data packet belongs.

s506. The virtual switch forwards the data packet to a receive end. The virtual switch performs this step after determining, in s505, that the expedited forwarding rule is configured for the data stream to which the data packet belongs.

s501, s502, s503, s504, s505, and s506 are a procedure in which when receiving a data packet belonging to the data stream for which the expedited forwarding rule is configured, the virtual switch forwards the data packet. The data stream is a packet that is based on the IP. When forwarding a packet that is based on the IP, the virtual switch bypasses the LINUX bridge to directly send the data packet to the receive end, thereby reducing times of data packet switching between a kernel mode and a user mode, and improving data packet forwarding efficiency.

s507. The virtual switch forwards the data packet to a LINUX bridge for security verification. To ensure integrity of the solution, the virtual switch performs this step if the expedited forwarding rule is not configured for the data stream to which the IP-based packet received by the virtual switch belongs or if the data packet received by the virtual switch is a special packet such that security verification on the data packet is performed in the LINUX bridge. That is, if security verification on the data packet received by the virtual switch has not been performed and the data packet is a non-IP special packet, the virtual switch performs this step after s502, s503, s504, and s505. If security verification on the data packet received by the virtual switch has not been performed, the data packet is a packet that is based on the IP, and the expedited forwarding rule is not configured for the data stream to which the data packet belongs, the virtual switch performs this step after determining, in s502, that security verification on the data packet has not been performed and determining, in s503, that the data packet is not a packet that is based on the IP.

s508. The LINUX bridge performs security verification on the data packet and determines whether verification on the data packet succeeds. IPTABLES configured in the LINUX bridge may be used to complete security verification on the data stream.

s509. The LINUX bridge forwards the data packet to the virtual switch such that the virtual switch can forward, to the receive end, the data packet on which security verification succeeds. The LINUX bridge performs this step when security verification on the data packet succeeds in the LINUX bridge in s508. After this step is completed, the procedure goes to s501 and s502, that is, the virtual switch receives the data packet and determines whether security verification on the data packet has been performed.

s510. The LINUX bridge discards the data packet. The data packet is a data packet on which security verification fails, ensuring integrity of the solution. If security verification on the data packet fails in the LINUX bridge in s508, the LINUX bridge performs this step, and forwarding of the data packet ends.

s511. The virtual switch determines whether the data packet is a packet that is based on the IP. The virtual switch performs this step if determining, in s502, that security verification on the data packet has been performed. This step distinguishes the data packet on which security verification has been performed. For the IP-based packet and the special packet, different forwarding procedures are used respectively in s512 and s513.

s512. The virtual switch establishes, based on the characteristic information of the data packet, the expedited forwarding rule for the data stream to which the data packet belongs and sends the data packet to the receive end. While forwarding the data packet in this step, the virtual switch can bypass the LINUX bridge when the virtual switch subsequently forwards another data packet in the data stream to which the data packet belongs. The virtual switch performs this step if determining, in s511, that the data packet is a packet that is based on the IP.

s513. The virtual switch sends the data packet to the receive end. The virtual switch performs this step if determining, in s511, that the data packet is not a packet that is based on the IP.

Figure 6A:
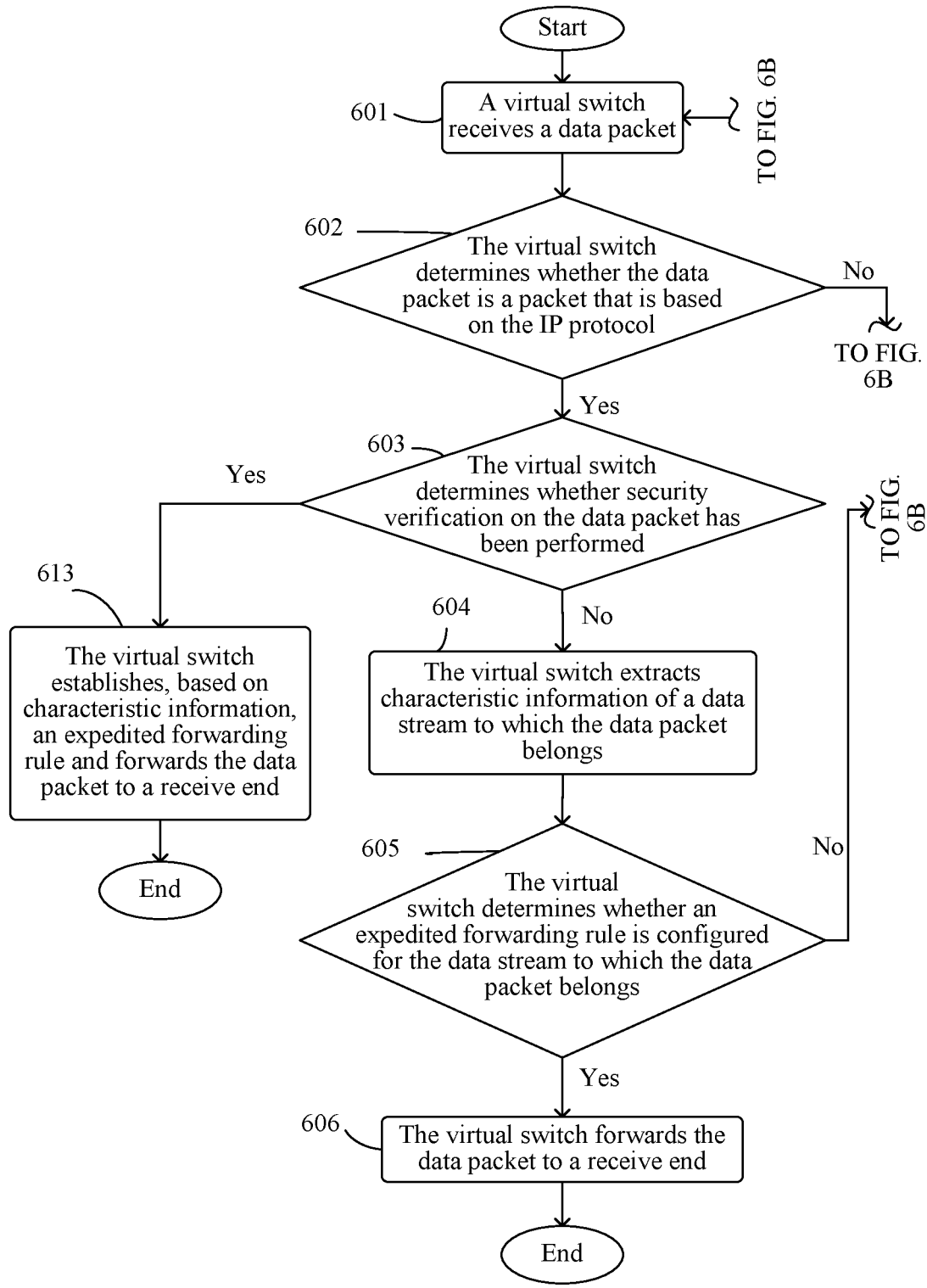
FIG. 6A and FIG. 6B are a schematic flowchart of another data transfer according to an embodiment of the present disclosure.
Figure 6B:
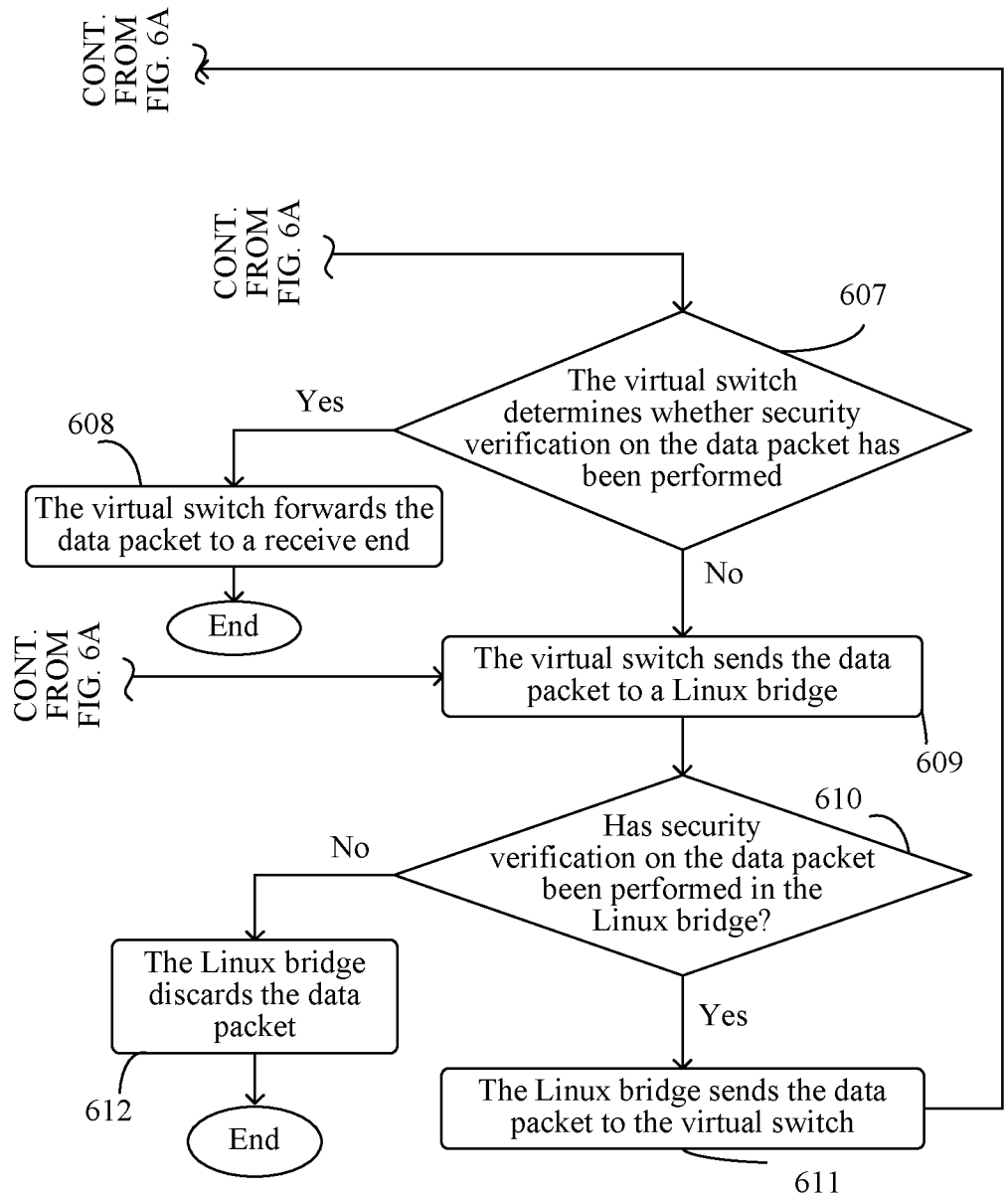

In another embodiment of the present disclosure, after receiving a data packet, a virtual switch first determines whether the data packet is from a LINUX bridge and then determines whether the data packet is a packet that is based on the IP. A specific procedure is shown in FIG. 6A and FIG. 6B.

s601. The virtual switch receives the data packet.

s602. The virtual switch determines whether the data packet is a packet that is based on the IP. The virtual switch performs this step if determining, in s602, that the data packet is a packet that is based on the IP. This step distinguishes an IP-based packet from a non-IP special packet, to implement different processing manners for two types of packets, ensuring integrity of the method procedure.

s603. The virtual switch determines whether security verification on the data packet has been performed. This step distinguishes a data packet that has not passed through the LINUX bridge from a data packet on which security verification has been implemented in the LINUX bridge, ensuring integrity of the solution.

s604. The virtual switch extracts characteristic information of the data packet for step s605. The virtual switch performs this step if determining, in s603, that security verification on the data packet has not been performed.

s605. The virtual switch determines whether an expedited forwarding rule is configured for a data stream to which the data packet belongs. Further, the virtual switch queries a connection tracking table based on the characteristic information extracted in step s604. In this step, the virtual switch determines whether the virtual switch can bypass the LINUX bridge to directly forward the data packet to a receive end.

s606. The virtual switch forwards the data packet to the receive end. The virtual switch performs this step after determining, in s605, that the expedited forwarding rule is configured for the data stream to which the data packet belongs.

s601, s602, s603, s604, s605, and s606 are a procedure in which when receiving a data packet belonging to the data stream for which the expedited forwarding rule is configured, the virtual switch forwards the data packet. The data stream is a packet that is based on the IP. When forwarding a packet that is based on the IP, the virtual switch bypasses the LINUX bridge to directly send the data packet to the receive end, thereby reducing times of data packet switching between a kernel mode and a user mode, and improving data packet forwarding efficiency.

s607. The virtual switch determines whether security verification on the data packet has been performed. The virtual switch performs this step if determining, in s602, that the data packet is not a packet that is based on the IP. Same as s603, this step distinguishes a data packet that has not passed through the LINUX bridge from a data packet on which security verification has been implemented in the LINUX bridge, ensuring integrity of the solution.

s608. The virtual switch forwards the data packet to the receive end. The virtual switch performs this step if determining, in s607, that security verification on the data packet has been performed. If the data packet is not a packet that is based on the IP and security verification on the data packet has been performed, the data packet is directly forwarded.

s609. The virtual switch forwards the data packet to the LINUX bridge for security verification. If the data packet received by the virtual switch is a non-IP special packet and security verification on the data packet has not been performed, the virtual switch performs this step after determining, in s602, that the data packet is not a packet that is based on the IP and determining that security verification on the data packet has not been performed in s607. If the data packet received by the virtual switch is a packet that is based on the IP, security verification on the data packet has not been performed, and the expedited forwarding rule is not configured for the data stream to which the data packet belongs, the virtual switch performs this step after determining, in s602, that the data packet is a packet that is based on the IP, determining, in s603, that security verification on the data packet has not been performed, and determining, in s605, that the expedited forwarding rule is not configured for the data stream to which the data packet belongs.

s610. The LINUX bridge performs security verification on the data packet and determines whether verification on the data packet succeeds. IPTABLES configured in the LINUX bridge may be used to complete security verification on the data stream.

s611. The LINUX bridge forwards the data packet to the virtual switch such that the virtual switch can forward, to the receive end, the data packet on which security verification succeeds. The LINUX bridge performs this step when security verification on the data packet succeeds in the LINUX bridge in s610. After this step is completed, the procedure goes to s601 and s602, that is, the virtual switch receives the data packet and determines whether the data packet is a packet that is based on the IP.

s612. The LINUX bridge discards the data packet. If security verification on the data packet fails in the LINUX bridge in s610, the LINUX bridge performs this step, and forwarding of the data packet ends.

s613. The virtual switch establishes, based on the characteristic information of the data packet, the expedited forwarding rule for the data stream to which the data packet belongs and sends the data packet to the receive end. The virtual switch performs this step if determining, in s603, that security verification on the data packet has been performed.

Figure 7:
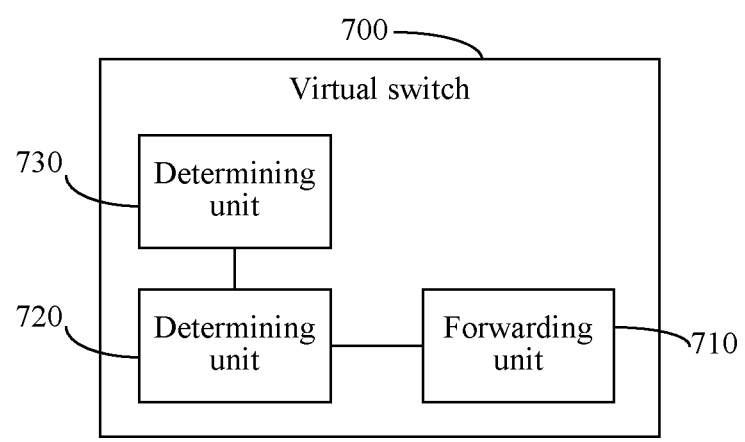
FIG. 7 is a schematic diagram of a virtual switch according to an embodiment of the present disclosure.

An embodiment of the present disclosure further provides a virtual switch 700, as shown in FIG. 7. The virtual switch 700 includes a forwarding unit 710, a determining unit 720, and an receiving unit 730.

In a specific implementation of the virtual switch 700, the receiving unit 730 is configured to receive a data packet, and the determining unit 720 is configured to extract characteristic information of the data packet, and determine, based on the extracted characteristic information of the data packet, whether an expedited forwarding rule is configured for a data stream to which the data packet belongs.

If the determining unit determines that the expedited forwarding rule is configured for the data stream to which the data packet belongs, the forwarding unit 710 is configured to bypass a security verification module to send the data packet to a receive end.

Meanwhile, if the determining unit 720 determines that the expedited forwarding rule is not configured for the data stream to which the data packet belongs, the forwarding unit 710 is further configured to forward the data packet to the security verification module.

The determining unit 720 is further configured to before the characteristic information of the data packet is extracted, determine whether security verification on the data packet has been performed, and if determining that security verification on the data packet has not been performed, perform the step of extracting characteristic information of the data packet.

If determining that security verification on the data packet has been performed, the forwarding unit 710 is further configured to extract the characteristic information of the data packet, and establish, based on the characteristic information of the data packet, the expedited forwarding rule for the data stream to which the data packet belongs. The forwarding unit is further configured to send the data packet to the receive end.

After determining that security verification on the data packet has not been performed and before the characteristic information of the data packet is extracted, the determining unit 720 is further configured to determine whether the data packet is a packet that is based on the IP, and if the data packet is a packet that is based on the IP, the determining unit 720 performs the step of extracting characteristic information of the data packet.

If the determining unit 720 determines that the data packet is a packet that is not based on the IP, the forwarding unit 710 is further configured to forward the data packet to the security verification module.

In another specific implementation of the virtual switch 700, the receiving unit 730 is configured to receive a data packet, and the determining unit 720 is configured to extract characteristic information of the data packet, and determine, based on the extracted characteristic information of the data packet, whether an expedited forwarding rule is configured for a data stream to which the data packet belongs.

If the determining unit determines that the expedited forwarding rule is configured for the data stream to which the data packet belongs, the forwarding unit 710 is configured to bypass a security verification module to send the data packet to a receive end.

Meanwhile, if the determining unit 720 determines that the expedited forwarding rule is not configured for the data stream to which the data packet belongs, the forwarding unit 710 is further configured to forward the data packet to the security verification module.

The determining unit 720 is further configured to before the characteristic information of the data packet is extracted, determine whether the data packet is a packet that is based on the IP, and if the data packet is a packet that is based on the IP, perform the step of extracting characteristic information of the data packet, if determining that the data packet is a packet that is not based on the IP, determine whether security verification on the data packet has been performed, and if the determining unit determines that security verification on the data packet has not been performed, the forwarding unit 710 is further configured to forward the data packet to the security verification module.

The determining unit 720 is further configured to after determining that the data packet is a packet that is based on the IP and before the characteristic information of the data packet is extracted, determine whether security verification on the data packet has been performed, and if determining that security verification on the data packet has not been performed, perform the step of extracting characteristic information of the data packet.

If determining that security verification on the data packet has been performed, the determining unit 720 is further configured to extract the characteristic information of the data packet, and establish, based on the characteristic information of the data packet, the expedited forwarding rule for the data stream to which the data packet belongs.

The forwarding unit 710 is further configured to send the data packet to the receive end based on a determining result that is determined by the determining unit and that security verification on the data packet has been performed.

Further, each unit in the virtual switch 700 may be implemented by a corresponding hardware chip. In another implementation, two or three units may be integrated in one hardware chip. In another implementation, each unit in the virtual switch 700 may be implemented by a processor executing a computer instruction. This is not limited in this embodiment of the present disclosure.

Accordingly, an embodiment of the present disclosure provides a non-volatile storage medium including a computer instruction, and a computer program product. A controller executes the computer instruction to implement the solutions described in the embodiments of the present disclosure.

In the several embodiments provided in the present disclosure, it should be understood that the disclosed apparatus and method may be implemented in other manners. For example, the unit division in the described apparatus embodiment is merely logical function division and may be other division in actual implementation. For example, a plurality of units or components may be combined or integrated into another system, or some features may be ignored or not performed. In addition, the displayed or discussed mutual couplings or direct couplings or communication connections between the units may be implemented through some interfaces.

In addition, functional units in the embodiments of the present disclosure may be integrated into one processing unit, or each of the units may exist alone physically, or two or more units are integrated into one unit.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data transfer method implemented by a virtual switch, wherein the data transfer method comprises:
   receiving a first data packet;
   determining, based on characteristic information, whether the first data packet is an Internet Protocol (IP) data packet or a non-IP data packet, wherein the virtual switch determines that the first data packet is the IP data packet when the first data packet has the characteristic information, and wherein the first data packet is the non-IP data packet when the first data packet does not have the characteristic information;
   forwarding, in response to determining that the first data packet is the non-IP data packet, the first data packet to a security verification system;
   extracting, in response to determining that the first data packet is the IP data packet, the characteristic information of the first data packet;
   determining, based on the characteristic information, whether an expedited forwarding rule is configured for a data stream to which the first data packet belongs, wherein the expedited forwarding rule indicates that a second data packet in the data stream has previously been verified by the security verification system with a secure verification result; and
   bypassing the security verification system to send the first data packet to a receive end when the expedited forwarding rule is configured for the data stream.

2. The data transfer method of claim 1, further comprising forwarding the first data packet to the security verification system when the expedited forwarding rule is not configured for the data stream.

3. The data transfer method of claim 1, wherein before extracting the characteristic information, the data transfer method further comprises:
   determining whether security verification on the first data packet has been performed; and
   extracting the characteristic information of the first data packet when the security verification on the first data packet has not been performed.

4. The data transfer method of claim 3, wherein when the security verification on the first data packet has been performed, the data transfer method further comprises:
   establishing, based on the characteristic information, the expedited forwarding rule for the data stream; and
   sending the first data packet to the receive end.

5. The data transfer method of claim 1, wherein the characteristic information comprises IP quintuplet information, wherein the IP quintuplet information comprises:
   an IP address of a transmit end that sends the first data packet to the virtual switch;
   an IP address of the receive end;
   a port number of the transmit end;
   a port number of the receive end; and
   a transport layer protocol of the first data packet, and wherein the expedited forwarding rule comprises the IP quintuplet information.

6. The data transfer method of claim 1, wherein the non-IP data packet comprises a fragmented packet.

7. The data transfer method of claim 1, wherein the non-IP data packet comprises a traceroute packet.

8. The data transfer method of claim 1, further comprising discarding the first data packet when the first data packet is forwarded to the security verification system and the security verification fails.

9. The data transfer method of claim 1, further comprising forwarding the first data packet to the receive end when the first data packet is forwarded to the security verification system and the security verification succeeds.

10. The data transfer method of claim 1, further comprising forwarding the first data packet to the security verification system for performing a security verification on the first data packet when the expedited forwarding rule is not configured for the data stream.

11. The data transfer method of claim 1, wherein bypassing the security verification system comprises bypassing the security verification system to send the first data packet to the receive end without performing the security verification on the first data packet when the expedited forwarding rule is configured for the data stream.

12. A virtual switch comprising:
   a memory configured to store execution instructions; and
   a processor coupled to the memory, wherein the execution instructions cause the processor to be configured to:
   receive a first data packet;
   determine, based on characteristic information, whether the first data packet is an Internet Protocol (IP) data packet or a non-IP data packet, wherein the virtual switch determines that the first data packet is the IP data packet when the first data packet has the characteristic information, and wherein the first data packet is the non-IP data packet when the first data packet does not have the characteristic information;
   forward, in response to determining that the first data packet is the non-IP data packet, the first data packet to a security verification system;
   extract, in response to determining that the first data packet is the IP data packet, the extract characteristic information of the first data packet, wherein the characteristic information comprises IP quintuplet information, and wherein the IP quintuplet information comprises an IP address of a transmit end that sends the first data packet to the virtual switch, an IP address of a receive end, a port number of the transmit end, a port number of the receive end, and a transport layer protocol of the first data packet;

determine, based on the characteristic information, whether an expedited forwarding rule is configured for a data stream to which the first data packet belongs, wherein the expedited forwarding rule indicates that a second data packet in the data stream has previously been verified by the security verification system with a secure verification result, and wherein the expedited forwarding rule comprises the IP quintuplet information; and bypass the security verification system to send the first data packet to the receive end when the expedited forwarding rule is configured for the data stream.

13. The virtual switch of claim 12, wherein the execution instructions further cause the processor to be configured to forward the first data packet to the security verification system when the expedited forwarding rule is not configured for the data stream.

14. The virtual switch of claim 12, wherein the execution instructions further cause the processor to be configured to:
determine whether security verification on the first data packet has been performed; and
extract the characteristic information of the first data packet when the security verification on the first data packet has not been performed.

15. The virtual switch of claim 14, wherein when the security verification on the first data packet has been performed, the execution instructions further cause the processor to be configured to:
establish, based on the characteristic information, the expedited forwarding rule for the data stream; and
send the first data packet to the receive end.

16. A computer program product comprising computer-executable instructions for storage on a non-transitory computer-readable storage medium that, when executed by a processor, cause a virtual switch to:
receive a first data packet;
determine, based on characteristic information, whether the first data packet is an Internet Protocol (IP) data packet or a non-IP data packet, wherein the virtual switch determines that the first data packet is the IP data packet when the first data packet has the characteristic information, and wherein the first data packet is the non-IP data packet when the first data packet does not have the characteristic information;
forward, in response to determining that the first data packet is the non-IP data packet, the first data packet to a security verification system;
extract, in response to determining that the first data packet is the IP data packet, the extract characteristic information of the first data packet;
determine, based on the characteristic information, whether an expedited forwarding rule is configured for a data stream to which the first data packet belongs, wherein the expedited forwarding rule indicates that a second data packet in the data stream has previously been verified by the security verification system with a secure verification result; and
bypass the security verification system to send the first data packet to a receive end when the expedited forwarding rule is configured for the data stream.

17. The computer program product of claim 16, wherein the computer-executable instructions further cause the virtual switch to forward the first data packet to the security verification system when the expedited forwarding rule is not configured for the data stream.

18. The computer program product of claim 16, wherein before extracting the characteristic information, the computer-executable instructions further cause the virtual switch to:
determine whether security verification on the first data packet has been performed; and
extract the characteristic information of the first data packet when the security verification on the first data packet has not been performed.

19. The computer program product of claim 18, wherein when the security verification on the first data packet has been performed, the computer-executable instructions further cause the virtual switch to:
establish, based on the characteristic information, the expedited forwarding rule for the data stream; and
send the first data packet to the receive end.

20. The computer program product of claim 16, wherein the characteristic information comprises IP quintuplet information, wherein the IP quintuplet information comprises:
an IP address of a transmit end that sends the first data packet to the virtual switch;
an IP address of the receive end;
a port number of the transmit end;
a port number of the receive end; and
a transport layer protocol of the first data packet, and wherein the expedited forwarding rule comprises the IP quintuplet information.

* * * * *

UNITED STATES PATENT AND TRADEMARK OFFICE
CERTIFICATE OF CORRECTION

PATENT NO. : 11,689,501 B2
APPLICATION NO. : 16/910954
DATED : June 27, 2023
INVENTOR(S) : Jing Huang et al.

It is certified that error appears in the above-identified patent and that said Letters Patent is hereby corrected as shown below:

In the Claims

Claim 12, Column 18, Line 63: "the extract characteristic" should read "the characteristic"

Signed and Sealed this
Eighth Day of August, 2023

Katherine Kelly Vidal
*Director of the United States Patent and Trademark Office*